July 15, 1952        S. KAUFMAN        2,603,390
METHOD AND MEANS FOR MAKING SHOULDER PADS
Filed July 26, 1946        3 Sheets-Sheet 1
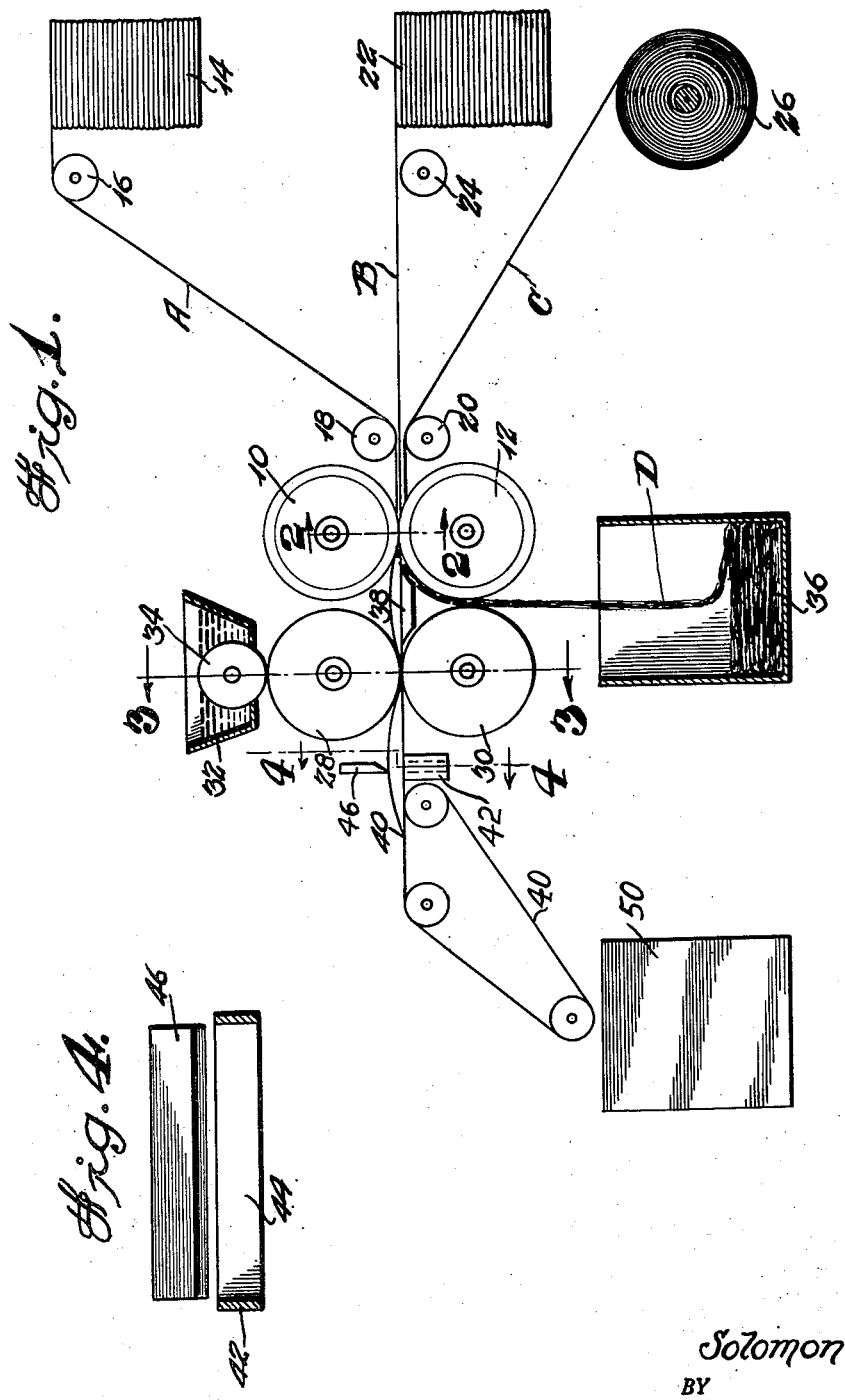
INVENTOR.
Solomon Kaufman.
BY
John F. Burge
Atty.

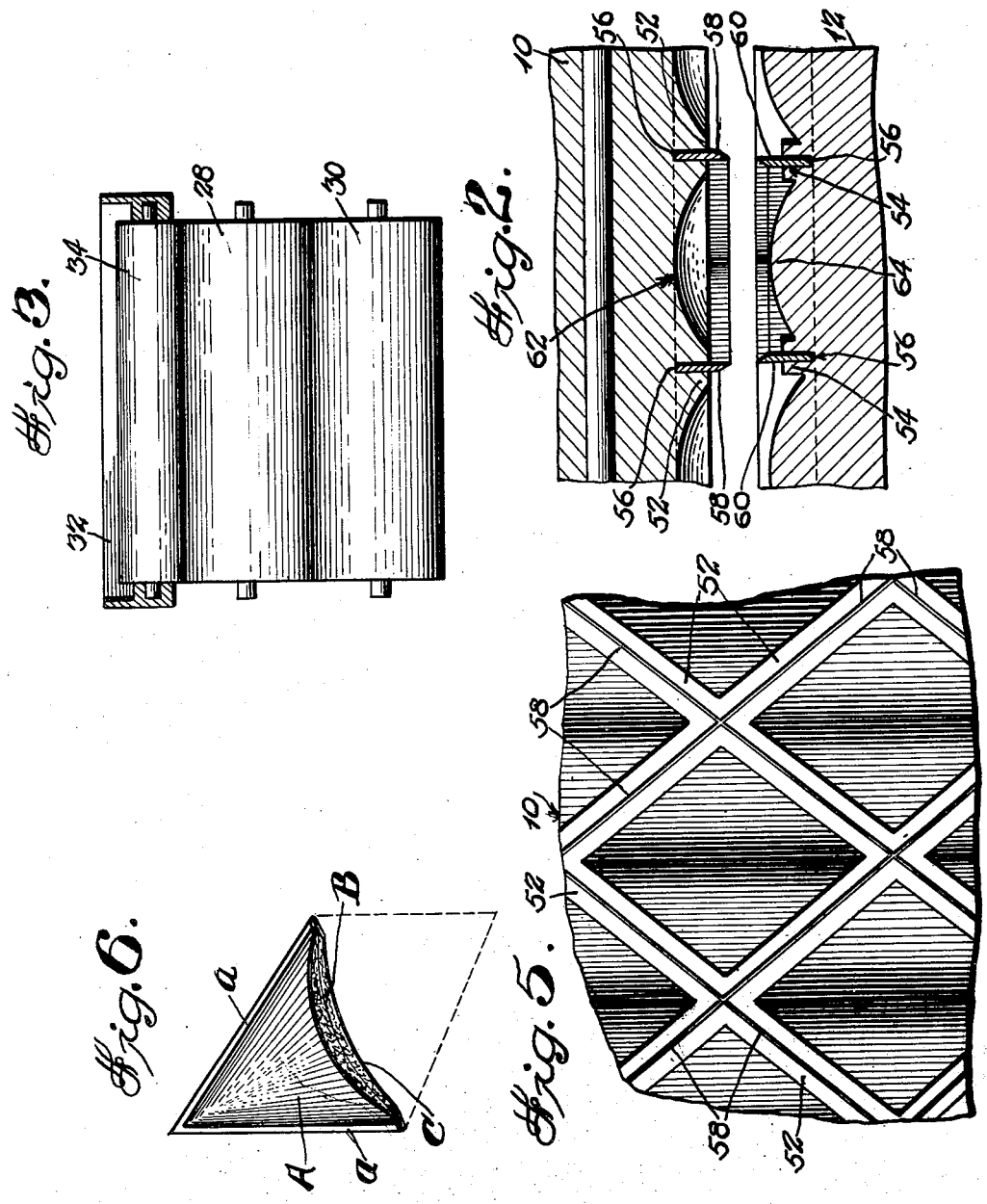

July 15, 1952  S. KAUFMAN  2,603,390
METHOD AND MEANS FOR MAKING SHOULDER PADS
Filed July 26, 1946  3 Sheets-Sheet 3
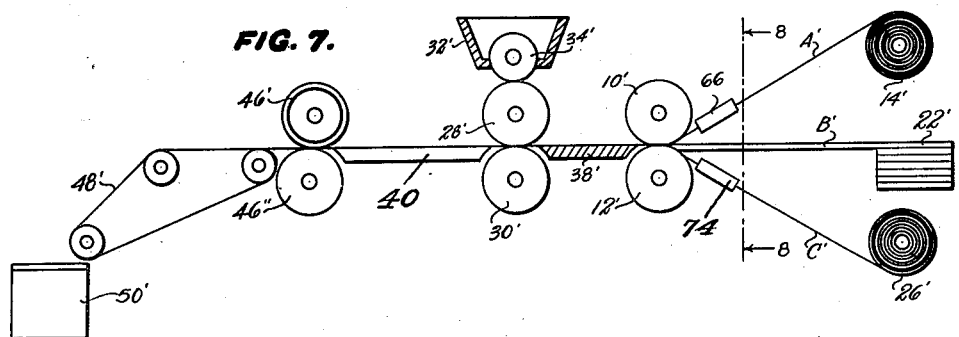
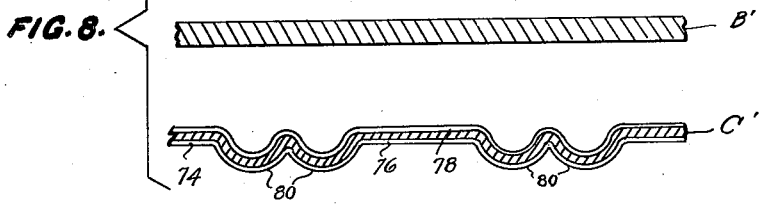
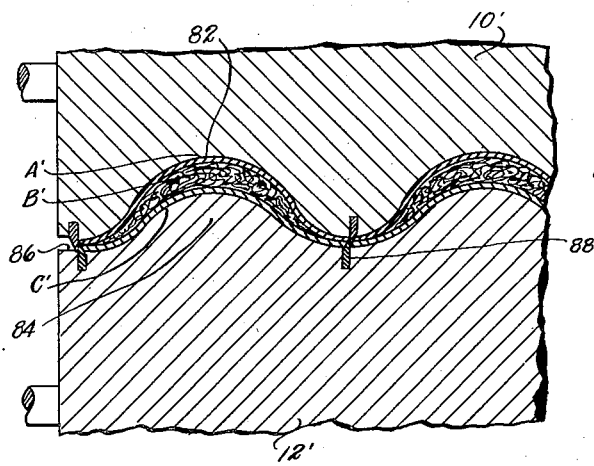
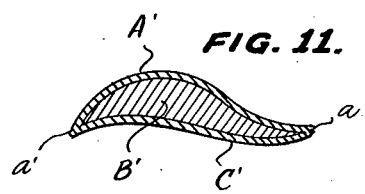
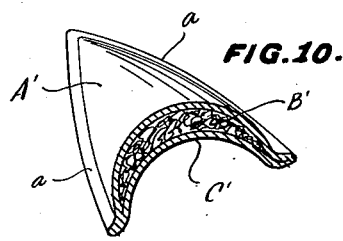
INVENTOR.
SOLOMON KAUFMAN
BY
ATTORNEY.

Patented July 15, 1952

2,603,390

UNITED STATES PATENT OFFICE 2,603,390

METHOD AND MEANS FOR MAKING SHOULDER PADS

Solomon Kaufman, New York, N. Y.; Bessie Kaufman administratrix of said Solomon Kaufman, deceased Application July 26, 1946, Serial No. 686,372

6 Claims. (Cl. 223—57)

This invention appertains to the manufacture of shoulder pads for incorporation in body garments for men and women, and has for one of its several objects and advantages, to provide methods and means for making a plurality of pairs of identical shoulder pads simultaneously from lengths of superimposed materials in a single cycle of operation and in a manner to eliminate the need for any and all hand operations, now common in the present manufacturing practice.

Another object of the invention has to do with the making of pairs of matching shoulder pads by the aforesaid methods and means, wherein the edges of the laminated material, after being previously cut to the required shape and size of a pad pair forming unit, are united by a suitable adhesive, applied to the cut edges under pressure, following which, the completed units are each cut in half to form the individual pads.

A further object of the invention lies in the provision of a machine, constituted in an assembly of cooperative mechanisms, one mechanism for feeding at least two lengths of shoulder pad forming materials into superimposed relation, another for cutting the laminated material to the required shape and size of two or more pad pair forming units simultaneously, another for applying the adhesive to the cut edges of the units under pressure, and still another for cutting the formed units at their transverse centers to form a like number of pairs of matching pads.

Still another object of the invention is to provide a means, combined with the aforesaid means for cutting the laminated material to form the pad pair forming units, for arching the units in the transverse direction and tapering the same both laterally and longitudinally, so that the individual pads, formed by halving the units, will conform substantially to the average curvature of the human shoulder.

With these and other objects and advantages of equal importance in view, the invention resides in the certain new and useful methods and means to be hereinafter more fully described, set forth in the appended claims, and illustrated in the accompanying drawings, wherein:

Figure 1 is a diagrammatical view, in side elevation of one form of mechanism for performing a pad making method, in accordance with the invention;

Figure 2 is an enlarged, fragmentary, transverse, vertical section, taken through the line 2—2 on Figure 1, looking in the direction of the arrows;

Figure 3 is a transverse, vertical section, taken through the line 3—3 on Figure 1, looking in the direction of the arrows, showing the adhesive applying and seam forming pressure rolls;

Figure 4 is a sectional view similar to that of Figure 3, but taken through the line 4—4 on Figure 1, looking in the direction of the arrows, showing the cutting device for halving the aforesaid paid pair forming units to form matching pairs of finished shoulder pads;

Figure 5 is an enlarged, fragmentary, view of the face of one of the pad forming and cutting rolls;

Figure 6 is a perspective view of one of the completed shoulder pads, after it has been severed from a formed pad pair unit;

Figure 7 is a view similar to that of Figure 1, but showing a modified form of mechanism for performing another method by which a completed shoulder pad will be given a more uniformly graduated curvature in both longitudinal and transverse directions;

Figure 8 is an enlarged, transverse, vertical section, taken through the line 8—8 on Figure 7, showing the cooperative gates for initially shaping the facing and backing materials to facilitate the entry of the same, together with the intermediate or filler material, into the throat of the shaping and cutting rolls;

Figure 9 is a sectional view similar to that of Figure 2, but showing the modified shaping and cutting rolls to receive the superimposed materials following the passage of the facing and backing materials through the aforesaid gates;

Figure 10 is a view similar to that of Figure 6, but showing the more arcuate form of shoulder pad; and, Figure 11 is a longitudinal, vertical section, through a completed shoulder pad.

Referring to the drawings, and more particularly to Figures 1 through 6, the working method illustrated therein generally consists in superimposing a length of a facing material A, such as buckram or the like, on an intermediate length of a filler material B, such as cotton batting or the like, which, in turn, is superimposed on a length of a backing material C, such as a lighter weight of buckram or other suitable fabric; simultaneously cutting and pressing the laminated material to the required shape and size of the pad pair forming units; then uniting the edges of the shaped and cut units with an adhesive applied to the same under pressure; and thereafter cutting each of the units in half to form a finished pair of matching pads. In addition to the shaping of each unit to the general plan-form necessary to the making of a matching pair of pads, the method may include the step of imparting an arched form, in the transverse direction, to the units simultaneously with the cutting and pressing operation, so that the individual shoulder pads will readily conform to the average curvature of the human shoulders, when a completed garment, embodying a pair of the shoulder pads, is fitted to a person.

As shown in Figures 1 through 6, the machine, as it is exemplified therein, is generally comprised in a pair of cutting and pressing rolls 10 and 12, mounted one above the other to have the superimposed materials fed flatwise between the same; the facing material A from a supply bale 14, over a guide roller 16 and beneath a second guide roller 18, the latter, together with a companion guide roller 20, being positioned one above the other, in closely spaced relation, immediately in front of and parallel to the cutting and pressing rolls 10 and 12. Likewise the filler material B is fed from a supply bale 22, over a guide roller 24 and directly therefrom to and between the guide rollers 18 and 20, immediately beneath the facing material A, while the backing material C is fed directly from a supply roll 26 and over the lower guide roller 20, immediately beneath the filler material B. From the guide rollers 18 and 20, the three materials, now in superimposed relation, pass horizontally to and between the cutting and pressing rolls 10 and 12, and, from thence, the cut pad pair forming units pass directly to and between a pair of adhesive applying and pressure rolls 28 and 30, which are also arranged one above the other and in juxtaposition to the cutting and pressing rolls; an adhesive reservoir 32 being mounted above the roll 28 and having an applicator roller 34 disposed in rolling contact with the effective surface of the roll 28. Waste portions D, resulting from the cutting out of the units from the laminated fabric, pass downwardly from the lower cutting and pressing roll 12 and into a receptacle 36. Positioned between the roll pairs 10, 12 and 28, 30, is a bed-plate 38, to direct the cut units from the roll pair 10, 12, to the roll pair 28, 30, the leading ends of the units being engaged by the latter while the trailing ends are being cut. In the passage of the units between the rolls 28 and 30, the edges thereof are firmly united by an application of the adhesive thereto under pressure.

From the rolls 28 and 30, the now completely formed pad pair units pass successively across a slotted cutting table 42 where they are transversely severed by a vertically reciprocating blade or knife 46, which has a shearing action with an edge of the slot 44, in the table 42, and is accurately timed to effect the cutting of the units at the transverse centers thereof, to assure of uniformity in the size of the individual pads, the latter, upon being cut, being delivered by an endless conveyor 40 to a receptacle 50.

The cutting and shaping rolls 10 and 12, as best shown in Figures 2 and 5, have their peripheries respectively provided with a series of interconnected flanges 52 and 54, arranged in the outline of a required number of pad pair unit patterns, e. g., substantially diamond shaped, which number will vary with the selected size and shape of the units to be produced from a laminated fabric of a given width. These sets of flanges 52 and 54 register with each other and are longitudinally grooved, as at 56, to receive relatively thin cutting blades 58 and 60, respectively, which cooperate to have a shearing action on the laminated fabric, when the rolls are simultaneously rotated.

In order to impart an arched shape to the pad pair units, the pattern areas, within the confines of the flanges 52, on the upper roll 10, are each dished in both the longitudinal and transverse directions, as at 62, while the like areas, within the confines of the flanges 54, on the lower roll 12, are each complementally bulged, as at 64, so that the laminated fabric of the pad pair units is compressed between these opposed surfaces, simultaneously with the cutting operation. The rolls 28 and 30 are made with flange sets identical with those of the rolls 10 and 12, except that the grooves and cutting blades are omitted, so that the adhesive applicator roller 34 has rolling contact with the edges of the flanges of the upper roll 28, to apply a coating or film of the adhesive thereto. By this arrangement, the completed pads, as shown in Figure 6, are arched in the transverse direction and tapered laterally in all directions, the secured edges being reduced to the required thinness by the pressure exerted thereon by the flanges of the rolls 28 and 30.

In setting up the machine, it will be understood that the cutting and shaping rolls 10, 12, the guide rollers 18, 20, the adhesive applying and pressing rolls 28, 30, and the reciprocating cutter blade 46, together with the endless conveyor 40, are to be power driven in unison and synchronized to perform their respective functions, which is to say that, as the successive transverse rows of pad pair units are in the process of being cut and initially shaped from the laminated fabric fed to the rolls 10 and 12, the leading apex ends thereof move onto and across the bedplate 38 and into engagement with the rolls 28 and 30, the points of engagement of said ends coinciding with the like ends of the flange patterns on the peripheries of the latter, so that the adhesive coating on the edges of the flanges of the upper roll 28 will be applied to the cut edges of the pad pair units and forced through the laminations by the pressure exerted thereon at the points of substantial contact of the flanges of both rolls. From the rolls 28, 30, the completed pad pair units are transferred to positions beneath the reciprocating cutter blade 46 and are cut in half as the transverse centers thereof move into alignment therewith. After being severed, the pairs of finished shoulder pads are transferred, by the conveyor 40, to the receptacle 50.

In the foregoing machine, it is to be noted that the rolls 10, 12, 28, and 30, are to be constructed to make any desired shape or form of shoulder pad pair forming unit, so that each finished pad will conform to the styles of garments and shoulder lines in vogue or fashionable, or in demand, at any particular period. Also, that the roll pairs 10, 12, and 28, 30, may be mounted in a reversed order, in which case, the materials A, B, and C, will first be fed to the adhesive applying rolls 28 and 30, thus outlining the pad pair units with adhesive seams, so that the materials will be secured in compressed state along the seam lines when subsequently fed to the cutting rolls 10 and 12. If the longer axis of the patterns for the pad pair units extend longitudinally of the rolls 10, 12, 28, and 30, instead of circumferentially thereof, then cutting rolls (not shown), having circular cutters, may be substituted for the conveyor 40, the cutting table 42, and the reciprocating cutting blade 46; a bedplate, similar to the bedplate 38, being mounted in rear of the rolls 28 and 30, to support the pad pair units in their transit from the latter to the substitute circular cutters. It is also possible that the rolls 10 and 12 be eliminated by providing the rolls 28 and 30 with the cutting blades 58 and 60, in which case the latter rolls will perform to complete the pad pair units simultaneously, leaving only the cutting operation, to sever the units at the transverse centers thereof, to be subsequently performed by either the reciprocating cutting blade 46, or the substitute circular cutters.

Now considering Figures 7 through 11, illustrating the modified mechanism for forming the shoulder pads having the greater arched and tapered form, which makes for a more flexible pad structure and a more snug fit over the shoulder of a person, A' designates the facing material; B', the filler material; and C', the backing material. Here, the facing and backing materials are drawn simultaneously from the supply rolls 14' and 26', respectively, through respective gate structures 66 and 74, which function to puff or full these materials to the general arched form of the pad pair units, without any appreciable stretching, prior to the passage of the same to the cutting and shaping rolls 10' and 12'. The gate 66 is formed of two metal plates 68 and 70, which are spaced apart sufficiently to have the facing material A' drawn therethrough; each of the plates being formed with at least two transversely disposed, upwardly curved portions 72, the portions in the lower plate 70 lying within those of the upper plate 68 and being spaced therefrom equally with flat portions of the plates at either side of the same. The gate 74 is likewise formed of two plates 76 and 78, which are spaced apart sufficiently to have the backing material C' drawn there-between, also without any appreciable stretching, and are each formed with pairs of adjoining, transversely disposed, downwardly curved portions 80, with the portions of the upper plate 76 lying within those of the lower plate 78 and spaced therefrom equally with flat portions at either side of the same. Each set of the portions 80, of the lower gate 74, is centered beneath a complemental set of the portions 72, of the upper gate 66, and the two gates are spaced apart sufficiently to have the filler material B' drawn between them from a supply bale or bolt 22'.

The supply roll 14', of the facing material A', is mounted above the bolt 22', of the filler material B', and the supply roll 26', of the backing material C', below the bolt, while the gates 66 and 74 are positioned in advance of the cutting and shaping rolls 10' and 12' and between them and the supply rolls and bolt; the filler material being drawn direct from the bolt horizontally between the gates and, together with the facing and backing materials, through the throat between the rolls 10' and 12', to which end, the gates are angularly disposed to direct the latter materials into contact with the upper and lower faces of the filler material, as the three materials enter the throat.

The cutting and shaping roll 10' is formed with at least two oppositely disposed pairs of depressions 82 in its face (only one pair of the same being shown in Figure 9 for purposes of the present description), each depression being of a shape of a selected form of shoulder pad pair unit and being lined up with a set of the curved portions 72 and 80, respectively, of the gates 66 and 74, to receive the puffed or fulled portions of the facing and backing materials drawn therethrough. The roll 12' is formed with like pairs of radially disposed projections 84, corresponding to the pairs of the depressions 82 and of a like shape to enter and leave the same, when the rolls 10' and 12' are rotated; the projections acting to compress the materials to the shape of the depressions, with a greater compression being exerted entirely about the edges of the pad pair units. In the shaping of the pad pair units within the depressions, the filler material B' is appreciably stretched, while the facing and backing materials A' and C' remain unstretched, due to the puffing or fulling imparted to the same by the gates 66 and 74. As shown in Figure 7, the cutting and shaping rolls 10' and 12' are positioned at the front edge of a bedplate 38', which supports the formed pad pair units as they pass from those rolls to the adhesive applying rolls 28' and 30'; the upper roll 28', as in the first instance, being contacted by an applicator roller 34' associated with a reservoir 32'.

In order to give to the pad pair units the desired arched formation, to produce the required central thickness and thinly compressed edge seams, and as shown in Figure 9, the projections 84, of the lower rolls 12' and 30' are made to a lesser height and a greater arc of curvature than the depth and arc of curvature of the depressions 82, of the upper rolls 10' and 28', so that, while giving such thickness to the central portions of the pad pair units, they also provide for a tapering off of the thickness to merge into the edge portions to be compressed and cut, the compression being effected by the face portions of the roll pairs, surrounding the depressions and projections, which are disposed in a closely spaced relation, as at 86, and the cutting by blades 88, secured in grooves formed in the face portions, the run of the grooves defining the outline of the formed pad pair units; the blades and grooves, however, being omitted from the adhesive applying rolls 28' and 30'.

From the rolls 28' and 30', the pad pair units pass over a bedplate 40' and into engagement with sets of upper and lower circular cutters 46' and 46'' (substituted for the cutting table 42 and the reciprocating blade 46), which act to sever the pad pair units at the transverse centers thereof. From the cutters 46', 46'', the pad pairs are received on a belt conveyor 48' and deposited by the same into a receptacle 50'.

At the start of operations with the machine of Figure 7, the different materials are drawn through the several devices and mechanisms by hand, with the filler material B' being initially stretched also by hand in order to assure that it will properly fit into the spaces between the opposed surfaces of the depressions and projections. Completed shoulder pads are illustrated in Figures 6, 10, and 11, with the seamed edges thereof being designated at a and a'; the pad of Figure 6 being the product of the machine of Figure 1, while the pad of Figure 10 the product of the machine of Figure 7, the latter pad having the higher arched form to more readily conform to the natural shoulder formation of a person. The pad of Figure 11 can also be made by the machine of Figure 7, but only by changing the shape of the depressions and projections 82 and 84, of the roll pairs 10', 12', and 28', 30', to that end. In this pad, all edges thereof are seamed, as indicated at a, a', as distinguished from the seaming of the side edges a only of the pads of Figures 6 and 10.

A length of a thin thermoplastic material may be substituted for either the facing material A, A', or the backing material C, C', or employed in addition to these materials and the filler material, or wadding B', and, in its use, the adhesive applying mechanism, i. e., the reservoir 32, the applicator roller 34, and the rolls 28, 30, may be eliminated and a heating means added, as by enclosing the rolls 10', 12', within a heated chamber (not shown). When heated, the plastic material becomes tacky and will cause the other of the pad pair unit forming materials to adhere to it, so that, when cooled, all of the materials will be firmly bonded together. If deemed necessary, the rolls 28, 30, may be retained, sans the reservoir and applicator roller, and housed within the heating chamber in lieu of eliminating them and housing the rolls 10', 12', therein.

Without further description, it is to be understood that the several movable parts of the disclosed machines are to be power driven in suitable manner to perform their respective functions as stated herein, and, also, that changes in design and minor details of construction and arrangement of the parts may be made within the purview of the appended claims without departing from the true scope and spirit of my invention in its broader aspects.

What I claim is:

1. The method of making shoulder pads in volume, which consists in feeding at least three lengths of suitable fabric materials into superimposed relation to form a laminated sheet of a desired thickness, progressively cutting said laminated sheet to form successive transversely extending rows of substantially diamond-shaped pad pair forming units, applying an adhesive to the edge portions of said units and simultaneously subjecting the same to pressure to secure them together, and then cutting said pad pair units at their transverse centers to form matching pairs of shoulder pads.

2. A mechanism for making shoulder pads and analogous articles, comprising a pair of opposed cutting rolls, each having its periphery provided with a plurality of flanges interconnected in a manner to define at least two parallel rows of pad pair unit patterns of a selected design, cutting blades mounted in edges of said flanges and coextensive therewith, means for feeding lengths of suitable fabric materials to said cutting rolls in superimposed relation, the cutting blades of said rolls cooperating to have a shearing action in cutting pad pair units from the superimposed materials, a pair of opposed pressure rolls mounted in juxtaposition to said cutting rolls and adapted to receive the cut pad pair units from the latter, each of said pressure rolls having its periphery provided with flanges corresponding in number and arrangement to those on said cutting rolls so as to engage edge portions of said pad pair units, means for applying an adhesive to the flanges of one of said pressure rolls to secure said edge portions together, and a cutter device to receive the completed pad pair units from said pressure rolls and sever the same at the transverse centers thereof to form matching pairs of shoulder pads.

3. The invention as in claim 2, with cooperative means on the peripheries of said cutting and pressure rolls to shape said pad pair units to substantially arcuate form in a direction transversely thereof, simultaneously with the cutting and adhesive application operation of said rolls.

4. The invention as in claim 2, with one each of the cutting and pressure rolls having the areas between said flanges concaved and those of the opposing rolls convexed to shape said pad pair units into substantially arcuate form in the transverse direction, simultaneously with the cutting and adhesive applying operations.

5. The invention as in claim 2, wherein at least three lengths of the fabric materials are employed to form the laminated sheet of required thickness, and a means is provided to full, without stretching, the outer of said fabric lengths into parallel longitudinally extending areas which are substantially arcuate in form in the transverse direction, preceding the passage of the laminated sheet to said cutting and pressure rolls, the areas of the peripheries of one each of the latter, within the confines of said flanges, being concaved and those of the others being convexed to receive the fulled portions of said outer fabric lengths to maintain the arched formation in the pad pair units during the operation of said rolls and, at the same time, effect a stretching of the intermediate of said fabric lengths so that it will conform to the arched formation of the outer fabric lengths.

6. A mechanism for making shoulder pads and analogous articles in volume, comprising a pair of opposed cutting rolls, each having its periphery provided with a plurality of flanges interconnected in a manner to define at least two parallel rows of pad patterns of a selected design, cutting blades mounted in the edges of said flanges and coextensive therewith, means for feeding lengths of suitable fabric materials to said cutting rolls in superimposed relation, the cutting blades of said rolls cooperating to have a shearing action in cutting pad assemblies from the superimposed materials, a pair of opposed pressure rolls mounted in juxtaposition to said cutting rolls and adapted to receive the cut pad assemblies from the latter, each of said pressure rolls having its periphery provided with flanges corresponding in number and arrangement to those on said cutting rolls so as to engage the edge portions of said pad assemblies, and means for applying an adhesive to the flanges of one of said pressure rolls to compress said edge portions together to complete the pad formations.

SOLOMON KAUFMAN.

REFERENCES CITED

The following references are of record in the file of this patent:

UNITED STATES PATENTS

| Number | Name | Date |
|---|---|---|
| 359,441 | Goldman | Mar. 15, 1887 |
| 1,056,896 | Fischman | Mar. 25, 1913 |
| 1,595,899 | McDonough | Aug. 10, 1926 |
| 1,788,126 | Sladdin | Jan. 6, 1931 |
| 2,170,199 | Hawkins et al. | Aug. 22, 1939 |
| 2,172,499 | Chaissaing | Sept. 12, 1939 |
| 2,187,343 | Crockford | Jan. 16, 1940 |
| 2,424,482 | Mechur et al. | July 22, 1947 |
| 2,425,227 | Bloom | Aug. 5, 1947 |